United States Patent [19]

McComb

[11] 4,411,560
[45] Oct. 25, 1983

[54] PNEUMATIC HOPPER DISCHARGE OUTLET

[75] Inventor: Ronald J. McComb, Youngstown, Ohio

[73] Assignee: The Youngstown Steel Door Company, Cleveland, Ohio

[21] Appl. No.: 243,390

[22] Filed: Mar. 13, 1981

[51] Int. Cl.³ .......................................... B65G 53/40
[52] U.S. Cl. .................................. 406/128; 406/145; 406/131; 222/200
[58] Field of Search ........................ 406/128–133, 406/145; 222/554, 545, 556, 163, 196, 199, 200; 105/247, 283; 251/308, 305

[56] References Cited

U.S. PATENT DOCUMENTS

| | | | |
|---|---|---|---|
| 3,268,267 | 8/1966 | Nelson | 406/132 |
| 3,482,741 | 12/1969 | Fritz | 222/554 |
| 3,527,503 | 9/1970 | Mundinger | 406/145 X |
| 3,632,174 | 1/1972 | Miller | 406/128 X |
| 3,637,262 | 1/1972 | Adler | 406/128 |
| 3,674,238 | 7/1972 | Pickles et al. | 251/309 |
| 3,797,891 | 3/1974 | Fritz | 406/131 X |
| 4,114,785 | 9/1978 | Dugge | 222/545 |

Primary Examiner—John J. Love
Assistant Examiner—L. E. Williams
Attorney, Agent, or Firm—Fay & Sharpe

[57] ABSTRACT

A pneumatic hopper discharge outlet is fastened to the bottom of railway hopper cars for controlling the discharge of lading. The outlet includes a pair of side walls, a pair of sloping side walls, and a valve shaft which is rotatably mounted in the end walls and extends longitudinally between the side walls. An eccentric valveshaft mounting is disposed on each end wall for rotation about a valve shaft mounting axis and includes a valve shaft receiving bore disposed eccentric to the valve shaft mounting axis. By rotating the eccentric valve shaft mounting, the lateral position of the valve shaft relative to the side walls is adjusted. Lading which has passed the valve shaft is received in a trough and is conveyed through a transition tube to conventional pneumatic off-loading equipment. In transit, the transition tube is closed by a closure cap assembly. This closure cap assembly includes a closure cap loosely pivoted about a pivot axle on the transition tube as well as means for adjustably locking the closure cap in a closed position.

13 Claims, 8 Drawing Figures

FIG. I

PNEUMATIC HOPPER DISCHARGE OUTLET

BACKGROUND OF THE INVENTION

This application pertains to the art of handling granular or particulate material or lading and more particularly to discharge outlets therefor. The invention is particularly applicable to pneumatic discharge outlets for railway hopper cars and will be described with particular reference thereto. It will be appreciated, however, that the application has broader applications including stationary and truck-mounted hoppers for a wide variety of granular and particulate materials.

Heretofore, railway hopper car pneumatic discharge outlets have generally included a pair of downward converging side walls mounted between a pair of oppositely disposed end walls. The side walls terminated at their lower ends at a pair of longitudinal edges between which was disposed a rotatable valve shaft. The valve shaft was rotatable between different positions for selectively allowing and blocking the flow of materials or lading therepast into a trough disposed therebelow. The trough was permanently connected at its ends with transition tubes which were closed by removable closure caps. Each transition tube was adapted to be connected with standardized pneumatic withdrawal apparatus for removing the lading from the hopper car.

One of the principal problems with or drawbacks to prior pneumatic hopper discharge outlets has been keeping the valve shaft and the longitudinal edges of the sloping side walls accurately positioned relative to each other. Even if accurately aligned at the factory, wear and rough handling tend to bring on or cause a misalignment which results in irregular and uneven lading discharge.

Another problem with the prior pneumatic hopper discharge outlets has been the ineffective sealing and awkward operation of their closure caps. Some prior art closure caps were pivoted at one side and clamped with a single eye bolt at the other side. As the pivot and sealing gasket became worn, the seal tended to lose integrity. Other closure caps were clamped securely to the outlet by an eye bolt disposed at each side but were interconnected with the outlet opening by awkward linkages. These arrangements prevented the closure caps from being totally removed from the outlet structure.

A still further problem with the prior art pneumatic hopper discharge outlets has been that it was awkward to disassemble and reassemble them for cleaning and repair purposes.

The present invention contemplates a new and improved discharge outlet which overcomes all of the above referenced problems and others. In addition, an outlet which is reliable and easy to operate, service and maintain is advantageously provided.

SUMMARY OF THE INVENTION

In accordance with the present invention, there is provided a hopper discharge outlet having an elongated valve shaft mounted for rotation about its longitudinal axis adjacent the discharge opening. The valve shaft is disposed longitudinally adjacent a sloping side wall of the hopper and an adjustable shaft mounting means operatively communicate with the shaft to effect selective adjustment thereof. This mounting means includes a shaft receiving bore and accommodates shaft adjustment in a direction transverse to its longitudinal axis.

In accordance with another aspect of the invention, the mounting means is rotatably mounted to an end wall of the hopper and with the valve shaft receiving bore being eccentrically disposed therein.

According to a further aspect of the invention, a closure assembly is provided which includes a pivotally mounted closure cap and means for selectively locking the closure cap in a closed position.

A principal advantage of the invention is that it readily facilitates adjustment and alignment of the valve shaft. Moreover, the invention promotes uniform discharge rates in its open position and sure or reliable termination of flow in its closed position.

Another advantage of the present invention resides in the provision of a closure cap assembly which is easy to manipulate and provides an effective seal.

Yet another advantage of the invention is in facilitating ready servicing and repair of pneumatic hopper discharge outlet assemblies.

Still further advantages and benefits will become apparent to others upon reading and understanding the following description of the preferred embodiment.

BRIEF DESCRIPTION OF THE DRAWINGS

The invention may take physical form in certain parts and arrangements of parts. The drawings are for purposes of illustrating a preferred embodiment only and should not be construed as in any way limiting the invention.

DESCRIPTION OF THE PREFERRED EMBODIMENT

Figure 1:
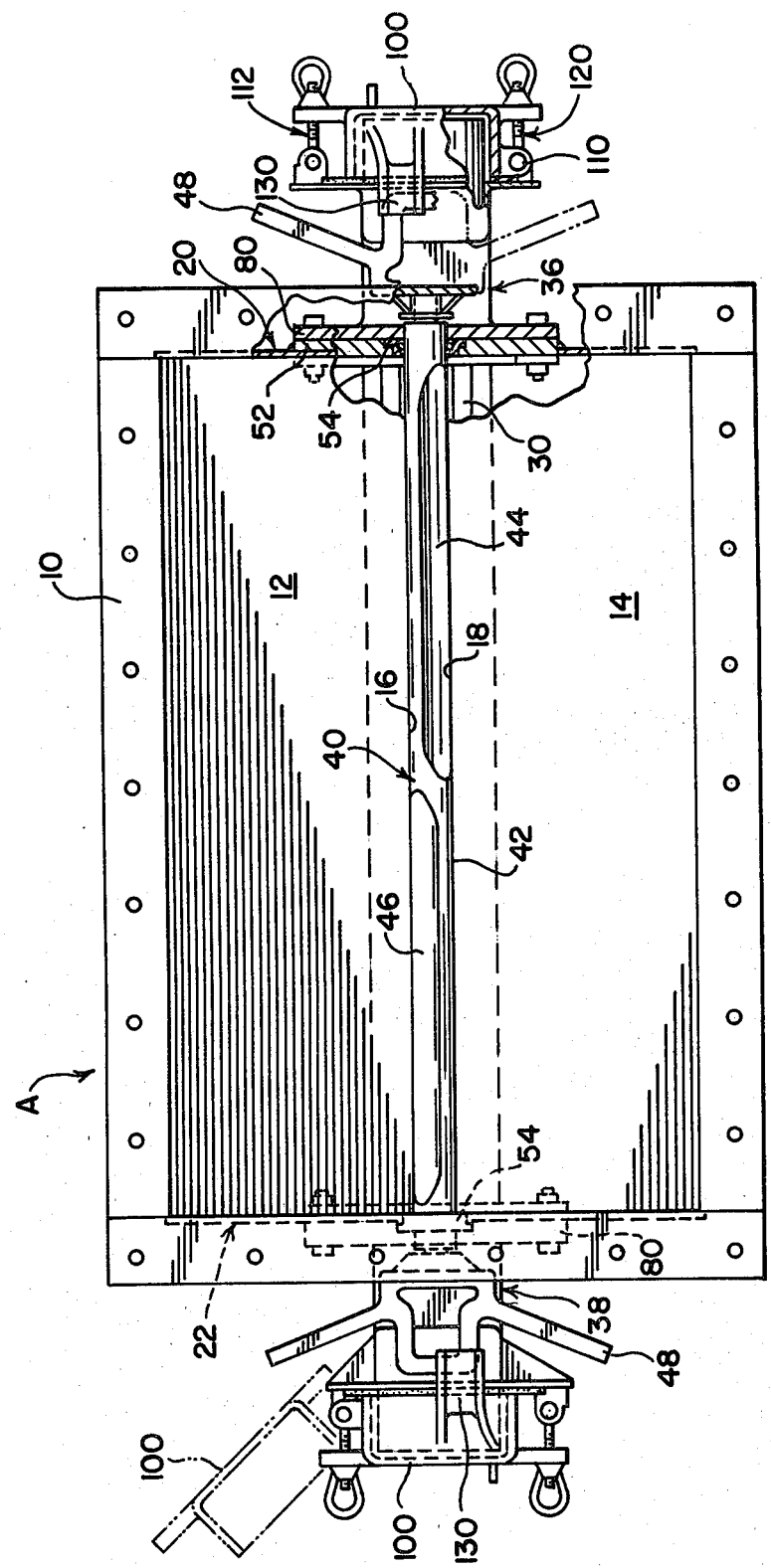
FIG. 1 is a plan view of a discharge outlet assembly constructed in accordance with the present invention and in partial cross-section for ease of illustration.
Figure 3:
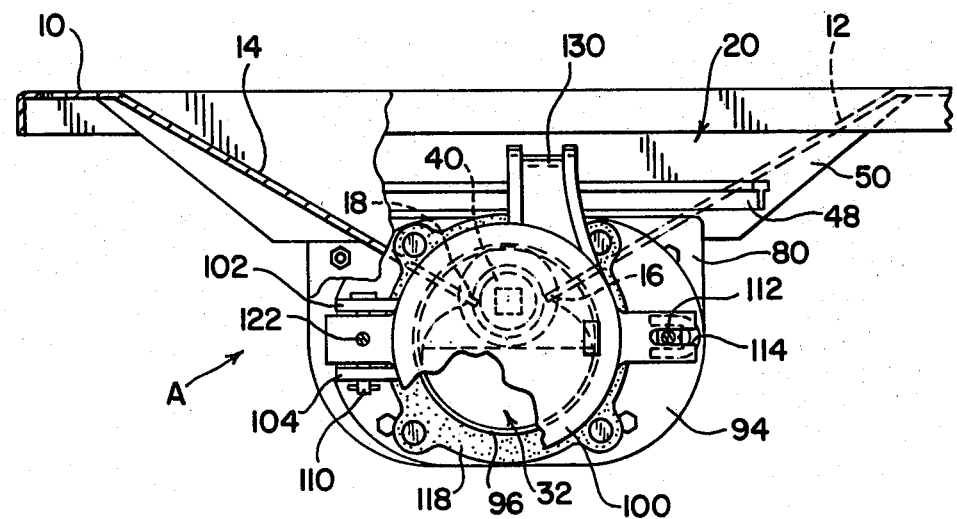
FIG. 3 is an end view in partial cross-section of the discharge outlet assembly of FIG. 1.
Figure 4:
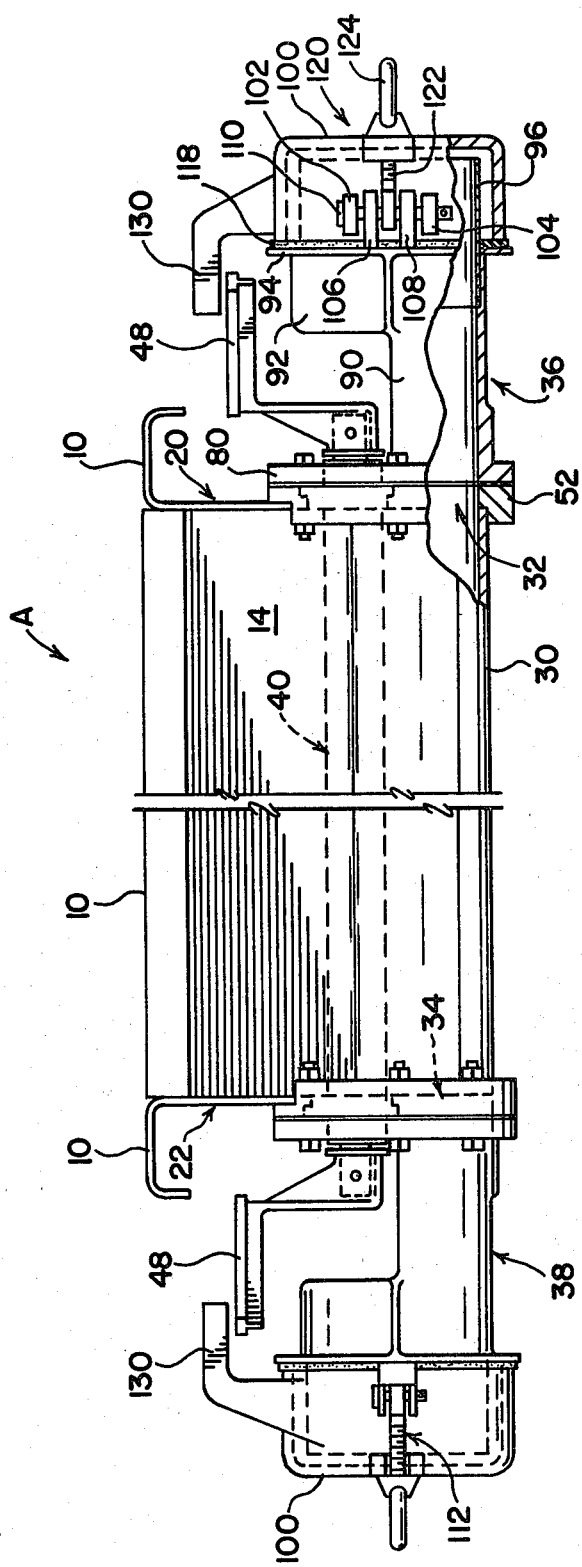
FIG. 4 is a side elevational view in partial cross-section of the discharge outlet assembly of FIG. 1.

Referring now to the drawings wherein the showings are for purposes of illustrating the preferred embodiment of the invention only and not for purposes of limiting same, FIG. 1 along with FIGS. 3 and 4 show a hopper discharge outlet assembly A adapted to be connected to a bottom opening in a railway hopper car.

In the preferred embodiment, the assembly includes a peripheral upper flange 10 which is adpated to be bolted to the hopper car, although welding and other convenient connecting means are contemplated. Depending downwardly from the peripheral flange 10 are opposed first and second sloping side walls 12, 14. These walls converge toward each other from the area of flange 10 and terminate at longitudinal edges 16 and 18, respectively. Longitudinal edges 16 and 18 extend substantially parallel to each other and form a gap area therebetween. Also depending from the peripheral flange 10 are first and second spaced apart end walls 20, 22. These end walls and side walls 12, 14 are interconnected at their side edges to form a chute which channels lading toward the gap area.

A trough 30 underlies the longitudinal edges 16 and 18 to receive lading which passes through the gap between the sloping side walls. The trough 30 is connected at one end with the first end wall 20 contiguous with a first generally semicircular opening 32 extending therethrough and is connected at its other end with the second end wall 22 contiguous with a second generally semicircular opening 34 extending therethrough. A first transition tube 36 is connected to the first end wall 20 contiguous with the opening 32 and a second transition tube 38 is connected to the second wall contiguous with opening 34. One end of each transition tube is shaped to conform with the shape of associated one of openings 32, 34 at their other end to conform with a standardized coupling or connector of pneumatic lading withdrawal or unloading equipment. The pneumatic withdrawal equipment (not shown) provides a vacuum which functions to draw the lading which has fallen into the trough 30, through one of the semicircular openings 32, 34, through the associated one of the transition tubes 36, 38, through the pneumatic withdrawal equipment itself, and then deposits the lading in a remote hopper or other storage facility.

Figure 7:
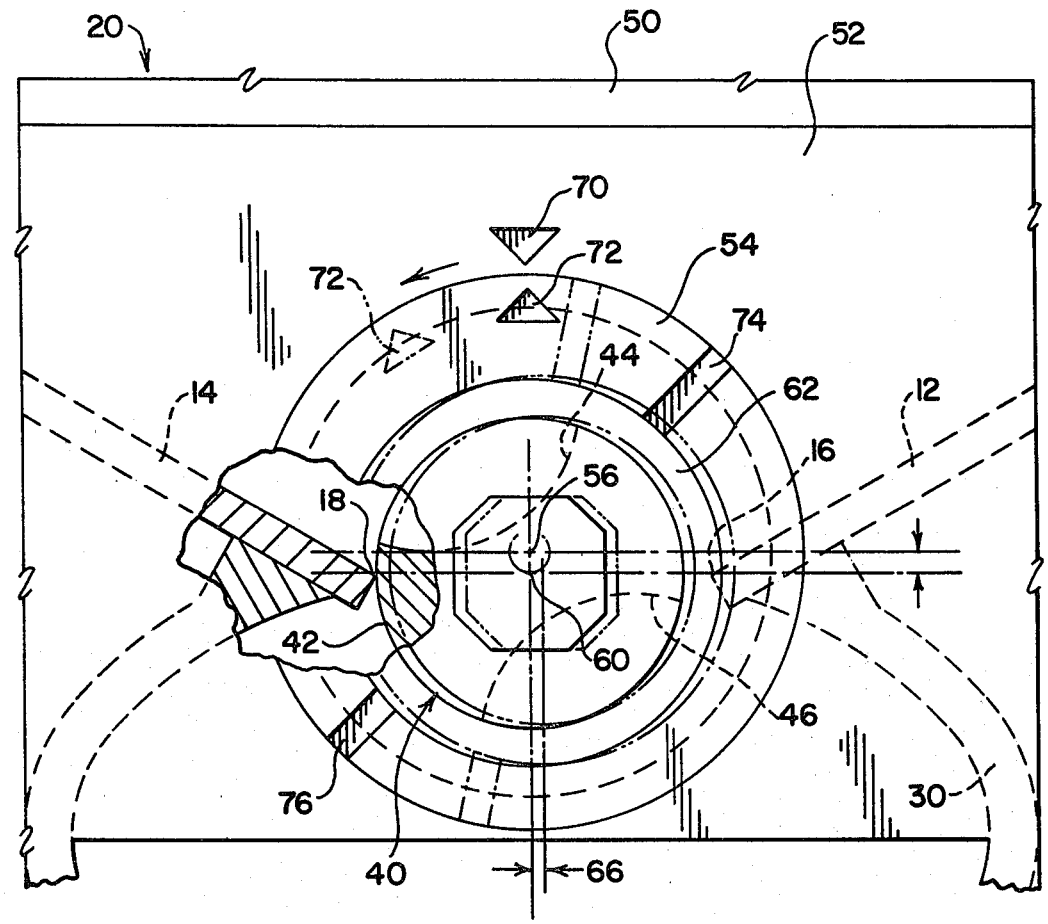
FIG. 7 is an end view of the eccentric valve shafting mounting of FIG. 5 with a rotated orientation of the eccentric mounting superimposed in phantom; and, FIG. 8 is an exploded perspective view of one outlet of the discharge outlet assembly of FIG. 1.

With continued reference to FIG. 1 and with further reference to FIGS. 3 and 7, a valve shaft 40 is disposed longitudinally between and parallel to side wall longitudinal edges 16, 18. In the preferred embodiment, the valve shaft has a circular cross-section of a diameter compatible with the distance or gap width between edges 16, 18 and includes at least one lading flow passage therein. Although the preferred embodiment contemplates use of an elongated shaft recess to define this flow passage as will be described, it will be appreciated that the passage could also take other forms such as a through bore or the like. Valve shaft 40 is rotatable between a first or closed position in which the shaft interacts or cooperates with side wall edges 16, 18 for blocking the flow of lading therepast and a second or open position where lading is permitted to flow through the valve shaft lading flow passage into trough 30.

In the preferred embodiment, the cylindrical outer surface 42 of the valve shaft actually interacts with the side wall longitudinal edges in the shaft first position. A first elongated recess 44 (FIG. 1) in the shaft outer surface defines a first lading flow passage which, in the shaft second position, is disposed adjacent longitudinal edge 18 for providing a flow path around the longitudinal edge into trough 30. The valve shaft is also rotatable to a third position where a second elongated recess 46 (FIG. 1) is disposed adjacent longitudinal edge 16 for providing a flow path around that edge into the trough. The two symmetrically disposed recesses or apertures 44, 46 enable the valve shaft to be operated from either end with rotational movements of the same direction and degree. It will be further appreciated, however, that the valve shaft may be designed to have other types and/or number of passages without in any way departing from the overall intent or scope of the invention. A handle 48 is pinned to each end of the valve shaft externally of the hopper to facilitate rotational shaft movement between at least the foregoing positions.

Figure 2:
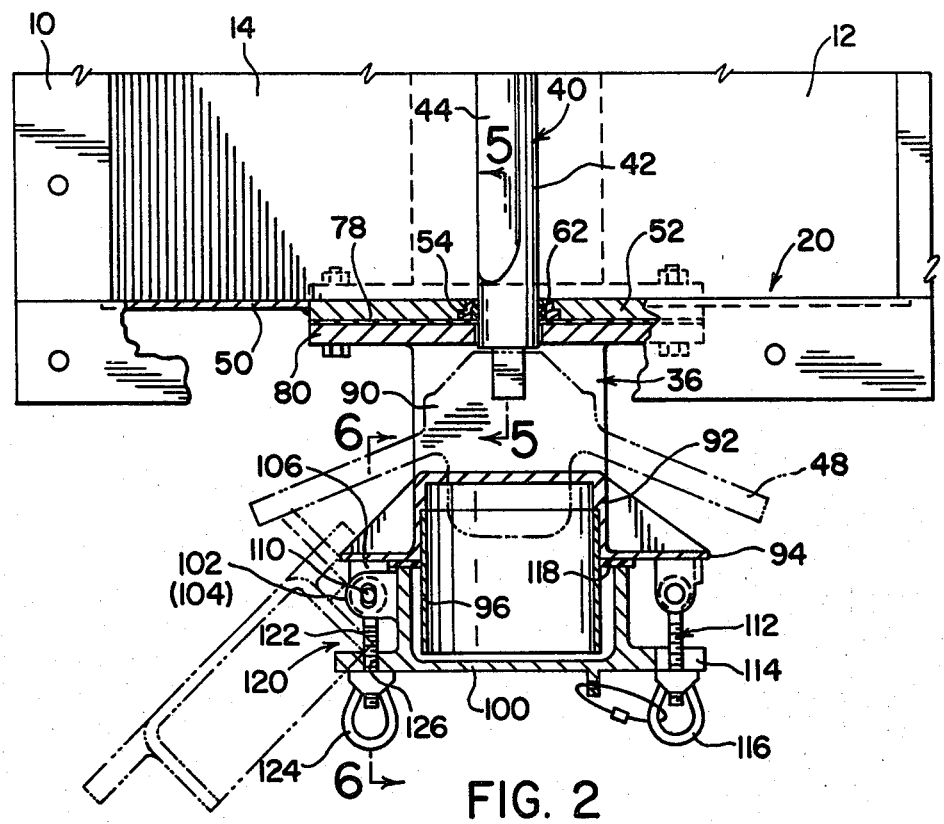
FIG. 2 is an enlarged view of a portion of the outlet assembly shown in FIG. 1.
Figure 5:
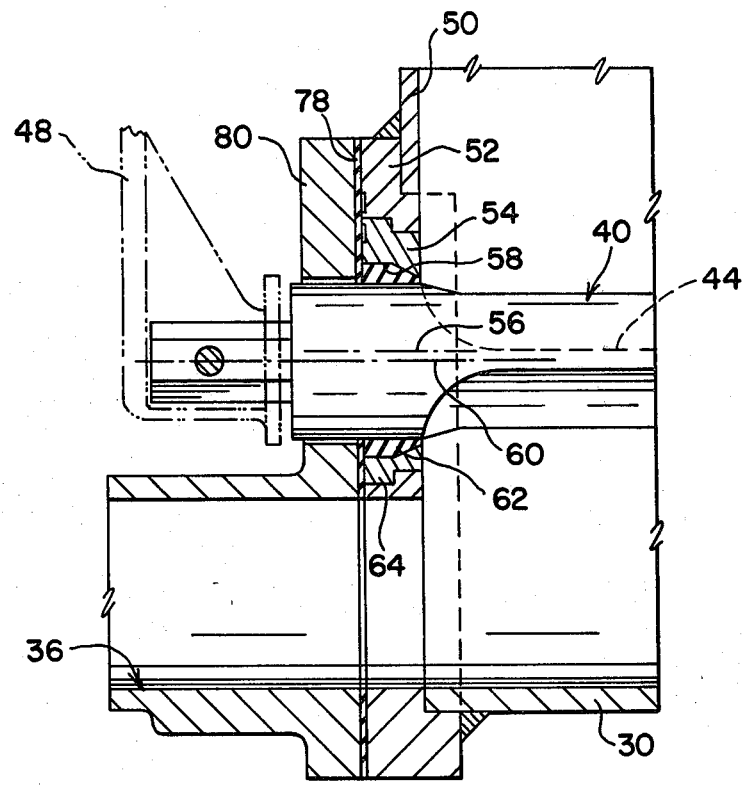
FIG. 5 is an enlarged cross-sectional view taken along lines 5—5 of FIG. 2 for showing the eccentric valve shaft mounting.
Figure 8:
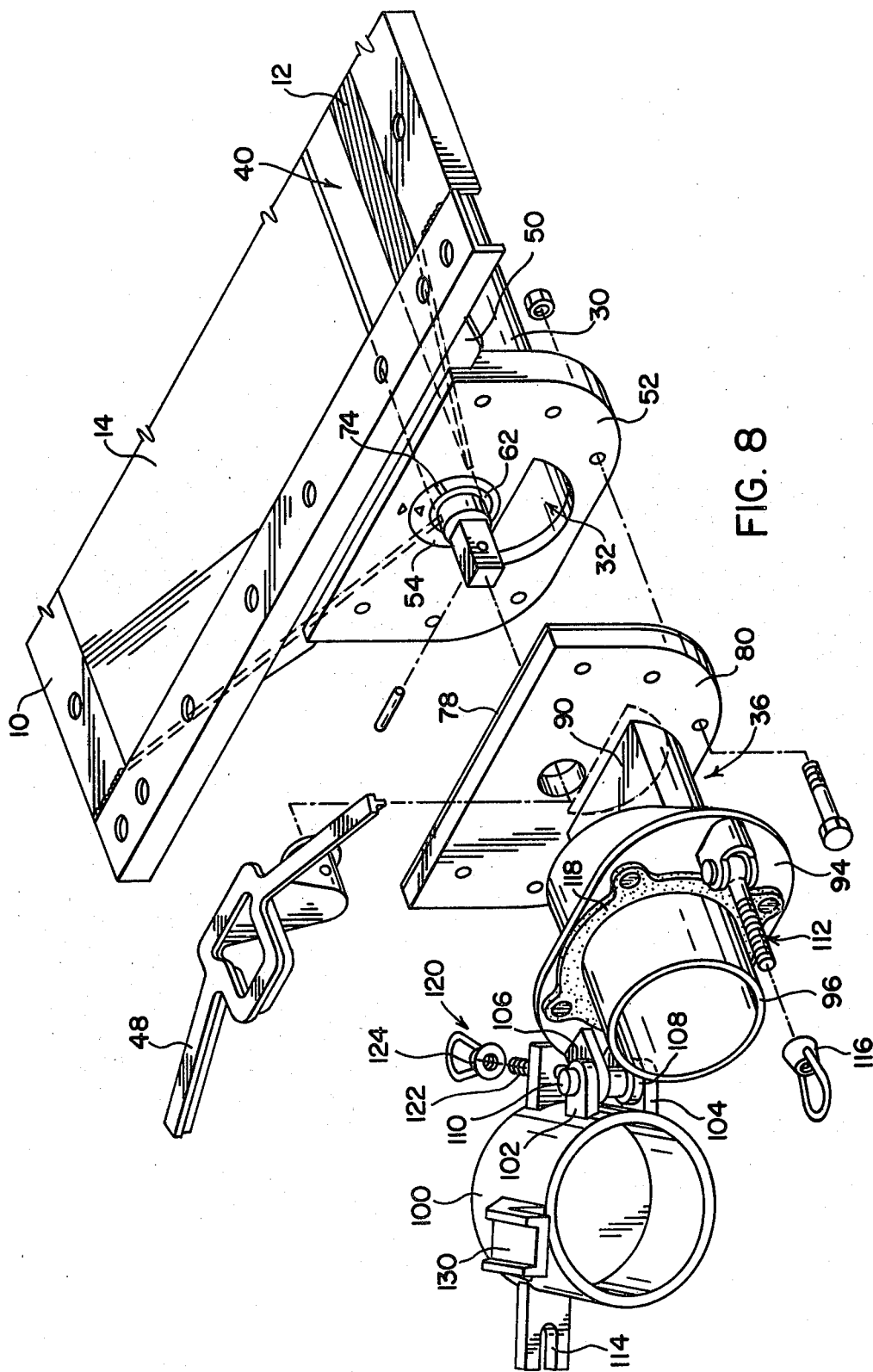

With particular reference to FIG. 7 as well as to FIGS. 2, 5, and 8, valve shaft 40 is rotatably mounted or journaled in both first and second end walls 20, 22 (FIG. 1). This mounting, which is the same at both end walls, will be described with reference to first end wall 20, it being appreciated that the description applies equally to second end wall 22 unless otherwise specifically noted.

In particular, end wall 20 includes a sheet metal portion 50 and a metal plate portion 52. Mounted to the end wall in plate portion 52 is an adjustable mounting means which journals valve shaft 40 for relative rotational movement. The adjustable mounting means is transversely or laterally adjustable to permit positioning of the valve shaft relative to the side walls, particularly longitudinal edges 16, 18 thereof. In the preferred embodiment, the adjustable mounting means comprises an eccentric seal retainer or bushing 54 which is rotatably mounted for relative rotation about a retainer or mounting means axis 56 and includes a bore 58 for receiving the valve shaft for relative rotation about a valve shaft axis 60. Bore 58 is disposed eccentrically relative to retainer axis 56 and receives a cylindrical, tapered seal 62. Thus, rotation of the mounting means or retainer 54 shifts the axis of the valve shaft transversely relative to side wall longitudinal edges 16, 18.

More specifically, eccentric retainer 54 has a circular outer surface which is received in a circular bore in the end wall 20. The retainer and the end wall have means such as a neck or jog 64 (FIG. 5) on their mating surfaces to inhibit relative longitudinal movement. To adjust valve shaft alignment, retainer 54 is rotated until the valve shaft is equally spaced from longitudinal edges 16, 18. This adjustment may be performed by rotating eccentric seal retainers 54 at both end walls or on just one end wall as is appropriate. In the illustration of FIG. 7, rotating the retainer between the solid and phantom line positions shifts the valve shaft and its axis a distance designated by numeral 66.

With continued reference to FIG. 7, the eccentric retainer includes an indicator means for indicating its rotational position relative to the end wall. This indicator means includes first indicia 70 on plate portion 52 of the end wall and corresponding second indicia 72 on the retainer 54. The first and second indicia are disposed so that they are aligned when the valve shaft axis is centrally disposed, i.e., the valve shaft and the retainer axes 58, 60 are vertically aligned. Retainer 54 further has an engaging means such as slots 74 and 76 to facilitate engaging it for rotation. In the assembled position, these slots engage a urethane gasket 78 which is clamped against the retainer to inihibit rotation.

Referring particularly to FIGS. 5 and 8, transition tube 36 is shown as being removably affixed to plate portion 52 of first end wall 20. The following description with regard to such mounting as well as the description of the attendant structure at the transition tube end is the same at both of hopper end walls 20, 22. Thus, and while specifically shown and described with reference to the structure at wall 20, the structure and components at wall 22 and transition tube 38 are identical thereto unless otherwise noted. In the preferred embodiment, an enlarged mounting flange 80 of the transition tube is conveniently bolted to the end wall to allow easy removal for cleaning and access to eccentric retainer 54. Gasket 78 which is disposed between the hopper end wall and the transition tube provides a seal and assits in locking the eccentric retainer in the preselected rotated position. When compressed by the bolts, the gasket deforms into slots 74, 76 of the eccentric retainer and firmly engages the retainer outer surface to inhibit it from rotating. To adjust the lateral position of the valve shaft, the transition tube is unbolted to gain access to the eccentric bushing.

With particular reference to FIGS. 2, 4, and 8, the transition tube 36 includes a necked down portion 90 having a cross-section that conforms to the semicircular end wall opening 32. The necked down portion provides space for the handle 48. The transition tube flares from the necked down portion 90 into a generally cylindrical portion 92. Adjacent the discharge end of cylindrical portion 92 is an elongated mounting surface 94 and a removable cylindrical sleeve 96 is received in portion 92 so as to extend outwardly therefrom. Sleeve 96 is accurately sized and shaped to be received by conventional, pneumatic off-loading equipment. Because sleeve 96 is readily removable, it may be quickly replaced should it become damaged or otherwise incapable of mating with the off-loading equipment.

Figure 6:
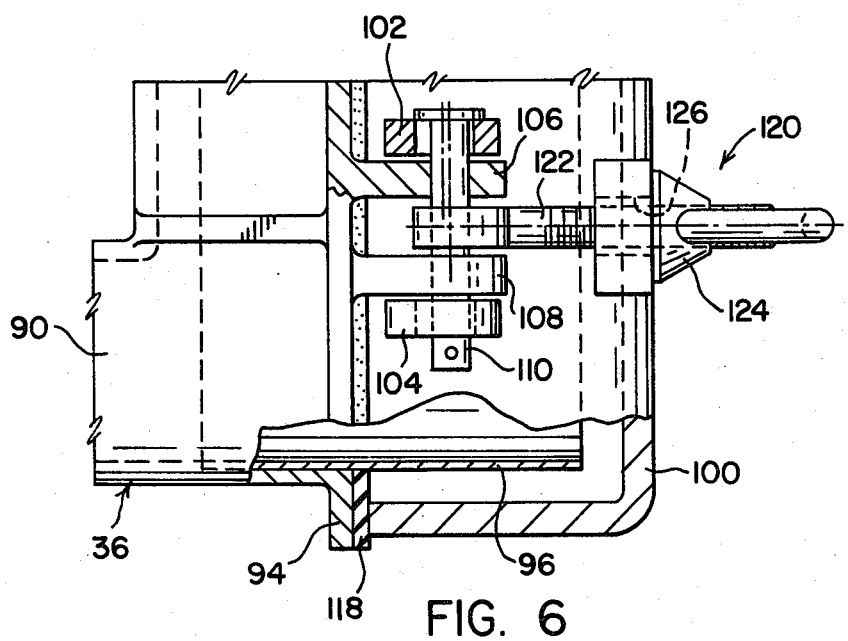
FIG. 6 is an enlarged cross-sectional view taken along lines 6—6 of FIG. 2 for showing the closure cap pivotal mounting assembly.

Referring to FIG. 8 as well as to FIGS. 2 and 6, a closure cap assembly is mounted on mounting surface 94 for selectively covering the end of sleeve 96. This closure cap assembly includes a closure cap 100 pivotally mounted relative to sleeve 96, i.e., transition tube 36. The pivot mounting is comprised of a pair of spaced flanges 102, 104 extending radially outward of the closure cap and which are connected to a pair of axial flanges 106, 108 disposed on the mounting surface 94 by means of a pivot pin or axle 110. This arrangement allows the closure cap to pivot about the pivot axle between an open position as illustrated in FIG. 8 and a closed position as illustrated in FIG. 6. A first eye bolt assembly 112 is pivotally mounted on the mounting plate 94 on the opposite side thereof from flanges 106, 108. This first eye bolt assembly is adapted to be received in an aperture 114 included in a first closure cap tab for selectively locking the cap in its closed position. It will be appreciated that by torquing a threaded end nut 116 against this tab, the closure cap can be tightly and securely sealed over the end of sleeve 96. A gasket 118 is advantageously provided to improve or enhance this sealing relationship.

It will be appreciated that as flanges 102, 104, 106, 108, axle pin 110, and gasket 118 become worn, closure cap 100 may fail to completely close the outlet, particularly adjacent the pivot mounting. To that end, a second eye bolt assembly 120 is provided adjacent the pivot mounting. This second eye bolt assembly includes an elongated bolt member 122 secured to pivot axle 110 so as to extend generally normal thereto and a threaded nut element 124 receivable on the bolt. The second eye bolt passes through an aperture 126 in a second closure cap tab. Pivot axle 110 is loosely received in either of flanges 102, 104 or flanges 106, 108, such that rotation of nut 124 draws the closure cap and axle toward each other. As best illustrated in FIG. 6, closure cap flanges 102, 104 of the preferred embodiment have enlarged pivot axle receiving apertures which are elongated axially of cap 100. With this arrangement, the cap may be adjusted in its covering relationship over sleeve 96 by means of nuts 116, 124 on eye bolt assemblies 112, 120 for improving the sealed relationship therebetween.

To inhibit valve shaft 40 from being moved out of its first or closed position when closure cap 100 is in its closed position, an L-shaped stop means 130 (FIG. 8) is provided on the closure cap for interacting with valve shaft handle 48. This stop means overhangs the forward end of the cap (FIG. 4) in a blocking relationship with handle 48 when the cap is in the closed position for preventing undesired shifting of the valve shaft of its second or open position. One of stop means 130 is associated with the closure cap at each end of transition tube 36 and arranged so that one stop means prevents valve shaft rotation in one direction while the other stop means prevents valve shaft rotation in the other direction.

The foregoing construction allows selective opening and closing of the hopper for either side thereof. Due to the identity of components, operation of the outlet is the same from either side.

The invention has been described with reference to the preferred embodiment. Obviously, modifications and alternations will occur to others upon reading and understanding the preceding specification. It is our intention to include all such modifications and alterations which come within the scope of the appended claims or the equivalents thereof.

Having thus described the invention, it is now claimed:

1. A pneumatic hopper discharge outlet comprising:
   a valve shaft having a longitudinal axis and mounted for rotational movement about said longitudinal axis;
   at least one sloping hopper side wall having a lower edge extending longitudinally of, and adjacent to said valve shaft; and,
   adjustable mounting means is mounted for rotation about a mounting means axis for adjustably mounting the valve shaft, said adjustable mounting means having a bore disposed eccentric to the mounting means axis for receiving the valve shaft and being movably mounted for selectively adjusting the position of the valve shaft transversely of the longitudinal axis.

2. The discharge outlet as defined in claim 1 wherein said hopper includes an end wall, the end wall having an aperture therein in which the mounting means is rotatably disposed.

3. The discharge outlet as defined in claim 2 further including indicating means for indicating the relative rotated position of the adjustable mounting means and the end wall.

4. The discharge outlet as defined in claim 3 wherein the indicating means includes a first indicia disposed on the adjustable mounting means and a second indicia disposed on the end wall.

5. The discharge outlet as defined in claim 1 wherein said hopper includes an end wall, the adjustable mounting means having a generally circular periphery which is rotatably received in a generally circular aperture in the end wall with the valve shaft receiving bore disposed eccentrically to said circular periphery, whereby the adjustable mounting means is rotatable relative to the end wall for adjusting the position of the valve shaft.

6. The discharge outlet as defined in claim 5 further including an annular seal disposed in the valve shaft receiving bore between the valve shaft and the adjustable mounting means.

7. The discharge outlet as defined in claim 1 further including:
   a pivot axle mounted adjacent the terminal end of the outlet;
   a first threaded member pivotally mounted adjacent the outlet on an arcuately spaced relationship with said pivot axle;

a second threaded member pivotally mounted on the pivot axle;

a closure cap pivotally mounted on the pivot axle such that the cap may be selectively pivoted between a first covering position with the outlet terminal end and a second position displaced from the first position to permit access to the outlet, the closure cap having a first aperture for receiving the first threaded member and a second aperture for receiving the second threaded member, whereby the threaded members are adapted to selectively and adjustably lock the closure cap in the first position.

8. A closure assembly for a pneumatic hopper discharge outlet, the assembly comprising:

- a closure cap pivotally mounted adjacent the outlet terminal end for movement between an open position relative to the terminal end and a closed position covering the terminal end;
- a first locking assembly pivotally mounted adjacent the outlet in a spaced relationship from said closure cap pivot mounting for selective cooperative engagement with the closure cap in the closed position;
- a second locking assembly pivotally mounted adjacent the closure cap pivot mounting for selective cooperative engagement with the closure cap in the closed position; and, a pivot axle having the closure cap and the second locking assembly mounted thereto for pivotal movement relative to the outlet.

9. The closure assembly as defined in claim 8 wherein the closure cap includes at least one pivot axle receiving aperture having a greater cross-sectional dimension than the pivot axle for allowing the closure cap to undergo pivotal and limited linear movement relative to the outlet.

10. A hopper discharge outlet for a railroad hopper car comprising:

(a) first and second sloping side walls which converge downwardly toward each other and terminate in first and second longitudinal edges disposed in a generally parallel, spaced relationship to each other;

(b) first and second end walls operatively connected with the first and second side walls and disposed generally transverse to the first and second longitudinal edges;

(c) a trough underlying the first and second longitudinal edges and extending between the first and second end walls;

(d) an elongated valve shaft rotatably mounted in the first and second end walls for rotation about a valve shaft longitudinal axis and being at least partially disposed between the first and second longitudinal edges in an overlying relationship with the trough, said valve shaft including at least one passage movable in response to rotation of the valve shaft between at least a first position permitting flow communicating between the hopper and trough and a second position blocking flow communication between the hopper and trough;

(e) adjustable mounting means for rotatably mounting the shaft in at least one end wall, said mounting means being laterally adjustable to permit selective lateral shifting of the valve shaft for accommodating adjustment thereof relative to the side wall longitudinal edges;

(f) a first transition tube operatively connected with the trough adjacent one end wall and having an outer terminal end; and, (g) a first closure cap assembly for selectively closing the first transition tube outer terminal end, the first closure cap assembly including a closure cap pivotally mounted for movement between a closed position covering said outer terminal end and an open position spaced from said outer terminal end, the closure cap assembly further including and at least two locking members pivotally mounted adjacent the transition tube for selectively locking communication with the closure cap in the closed position.

11. The outlet as defined in claim 10 further including a second transition tube operatively connected with the trough adjacent the other end wall and having an outer terminal end, a second closure cap assembly for selectively closing the second transition tube outer terminal end, first and second handles operatively connected with the valve shaft adjacent the first and second end walls externally of said hopper for effecting selective rotation of the valve shaft, and first and second stop means disposed on said closure cap assemblies for engaging said first and second handles when the cap assemblies are in the closed position for preventing rotation of the valve shaft, one of the stop means preventing rotation in one direction and the other of the stop means preventing rotation in the opposite direction.

12. The outlet as defined in claim 10 wherein the first transition tube is secured to the associated end wall by mechanical fastening means.

13. The outlet as defined in claim 12 wherein the adjustable mounting means is mounted for rotational movement in an aperture in the associated end wall, said outlet further including a compressible gasket operatively interposed between the first transition tube and the adjustable mounting means with securing of the first transition tube to the associated end wall compressing the gasket against the adjustable mounting means for inhibiting rotational movement thereof.

* * * * *